M. H. FARLEY.
AUTOMATIC SHUT-OFF VALVE.
APPLICATION FILED JULY 6, 1909.
948,135.
Patented Feb. 1, 1910.
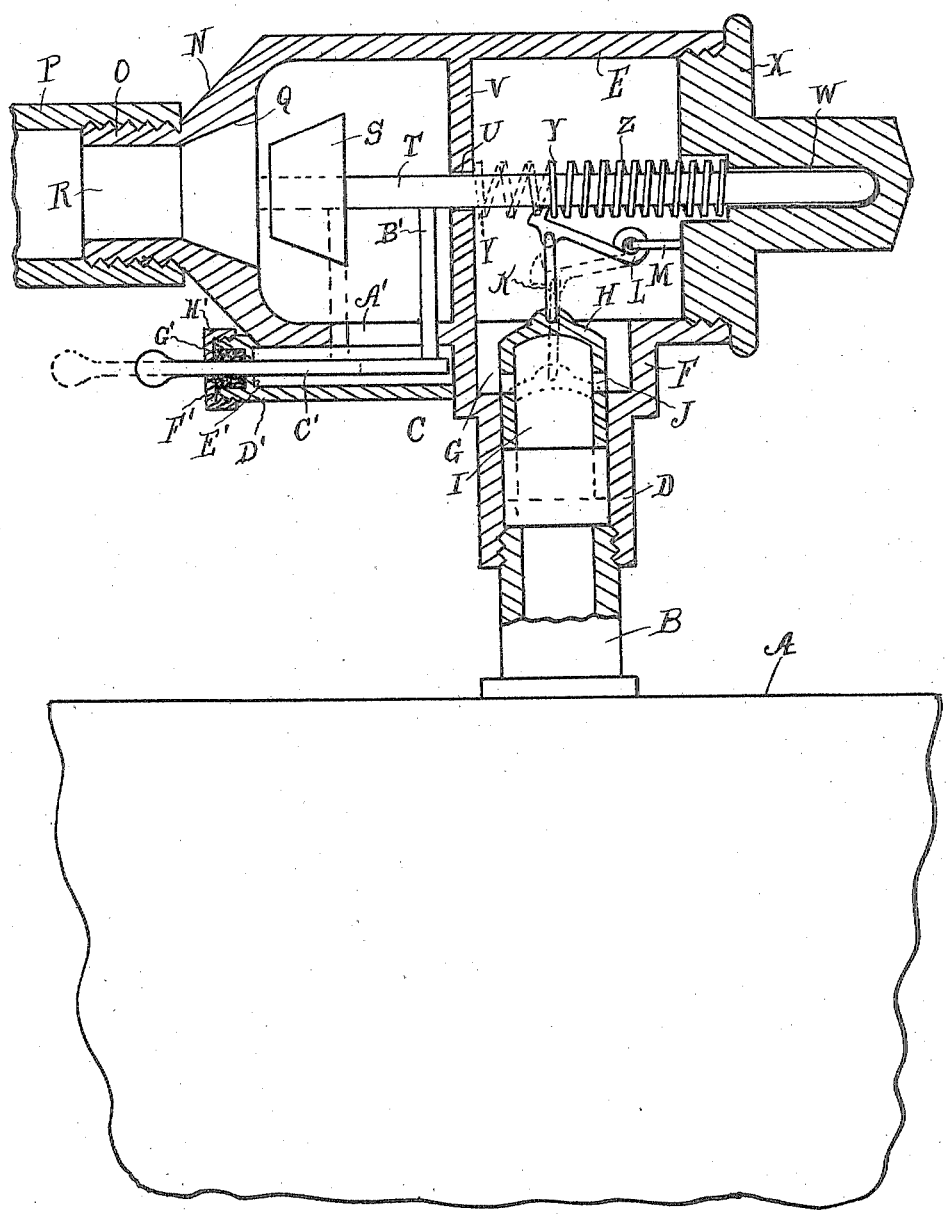
WITNESSES
INVENTOR
Michael H. Farley
BY
ATTORNEY

UNITED STATES PATENT OFFICE.

MICHAEL H. FARLEY, OF BREMERTON, WASHINGTON, ASSIGNOR OF ONE-THIRD TO FRANK CROWLEY, OF BREMERTON, WASHINGTON.

AUTOMATIC SHUT-OFF VALVE.

948,135. Specification of Letters Patent. Patented Feb. 1, 1910.

Application filed July 6, 1909. Serial No. 506,051.

*To all whom it may concern:*

Be it known that I, MICHAEL H. FARLEY, a citizen of the United States, residing at Bremerton, in the county of Kitsap and State of Washington, have invented a certain new and useful Improvement in Automatic Shut-Off Valves, of which the following is a specification.

My invention relates to a new and useful improvement in automatic shut off valves, and is especially adapted for use in gas service between the meter and the supply pipe leading to the fixtures in a building.

The object of the invention is to provide an exceedingly simple and effective device of this character which will be small and compact and inexpensive in the cost of manufacture.

A further object of the invention is to provide a shut off valve for use in conjunction with pre-payment meters, so that when the gas to which the user is entitled has been used, the valve will be automatically shut off to prevent the flow of gas when the next coin is placed in the meter until said valve has been opened. This will remind the person placing the coin in the meter to look over the gas fixtures to see that all of the valves are closed, which will prevent the loss of life by asphyxiation.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which the figure is a longitudinal sectional view of the valve made in accordance with my improvement showing its relation to a meter and showing it closed in dotted lines.

In carrying out my invention as here embodied, A represents a gas meter having the outlet pipe B leading therefrom, to which is secured the valve C by its inlet D, which is formed integral with the casing or body E. The inlet D has an off set F so as to form a space G about the sliding valve H, which is adapted to snugly fit within the inlet D, and this valve has a chamber I formed therein, the inlet of which is at the bottom. From this chamber I lead a number of passage-ways J to the outside of the valve.

To the upper end of the valve H is secured one end of the link K, the opposite end of which is secured to the swinging hook L, which is fastened to an eye or its equivalent M. The sides of one end of the casing E converge, as indicated by N so as to bring it to a convenient size for forming the connection O, on which is threaded the pipe P leading to the gas fixtures within the building. In that portion of the casing which converges is formed the conical valve seat Q having a passage-way R leading therefrom through the connection O to the pipe P. With the valve seat Q is adapted to engage the conical valve S having a stem T which passes through the opening U in the bridge V formed with the casing E, said stem T then extends rearwardly into the opening W formed in the cap X which is threaded into the casing E.

Secured to the stem T is a stop Y with which the hook L engages when the valve S is withdrawn from its seat Q. Coiled about the stem T is a coil spring Z, one end of which rests against the cap, the opposite end against the stop Y for normally holding the valve S to its seat Q.

In the casing E is formed a slot A' through which passes a vertical rod B', the upper end of which is attached to the stem T. To the lower end of this rod is secured a horizontal rod C' which is partially inclosed in the housing D', said housing being formed integral with the casing E and having a partition E' thereby forming a chamber F' in its outer end adapted to receive the packing G', and this packing is retained within the chamber by the cap H' which is threaded on the end of the housing D'. Said packing is used to prevent the escape of gas from the valve while passing from the meter to the supply pipes.

The operation of the device is as follows:—When a coin has been placed in the pre-payment meter A, the gas will at once flow through the pipe B into the inlet D, then into the chamber I of the sliding valve H, which will cause said sliding valve to be raised, allowing the gas to pass through the passage-ways J into the interior of the casing E. When the valve is in this position it will raise the hook L and by pressing the rod C' inward it will cause the valve S to be removed from its seat Q, at which time the hook L will engage the stop Y. This will allow the gas to pass unobstructed into the pipe P. When the gas due the consumer has been exhausted, the weight of the sliding valve H will draw the hook L downward disengaging it from the stop Y, at which time the spring Z will cause the valve S to take its seat, thus preventing any gas flowing to the pipe P should another coin be placed in the meter until this shut off valve is again opened which will remind the person to look after the valves of the gas jets to see that they are closed.

Of course I do not wish to be limited to the exact details of construction here shown as these may be varied within the limits of the appended claim without departing from the spirit of my invention.

Having thus fully described my invention, what I claim as new and useful, is—

In a device of the character described, a casing having an outlet and an inlet provided with an off set, said casing also having a slot formed therein, a conical valve seat in proximity to the outlet, a bridge having an opening formed therein formed integral with the casing, a cap provided with an opening threaded in one end of the casing, a conical valve, a valve stem secured thereto extending through the hole in the bridge and into the opening in the cap, a stop mounted on said stem, a spring coiled about said stem, one end of which rests against the cap, the opposite end against the stop, an eyelet, a swinging hook attached thereto, a sliding valve having a chamber therein, and provided with passageways leading from said chamber, said valve snugly fitting within the inlet adapted to be raised by the pressure of the gas, a link, one end of which is secured to the hook, the opposite end to the sliding valve, a housing formed integral with the casing about the slot therein, a partition formed with said housing in proximity to its outer end, a cap threaded thereon, a packing material placed in the space between the partition and the cap, a vertical rod secured to the valve stem passing through the slot in the casing, and a horizontal rod passing through the cap and partition into the housing secured to the vertical rod.

In testimony whereof, I have hereunto affixed my signature in the presence of two subscribing witnesses.

MICHAEL H. FARLEY.

Witnesses:
  GEORGE M. SCANNELL,
  FRANK CROWLEY.